ABSTRACT

United States Patent [19]
Hawley

[11] 4,295,998
[45] Oct. 20, 1981

[54] SELENIUM OR TELLURIUM TREATED SILICA

[75] Inventor: Gil R. Hawley, Bartlesville, Okla.

[73] Assignee: Phillips Petroleum Company, Bartlesville, Okla.

[21] Appl. No.: 130,632

[22] Filed: Mar. 14, 1980

[51] Int. Cl.$^3$ .................... B01J 21/06; B01J 27/00
[52] U.S. Cl. .................... 252/439; 252/458; 526/104
[58] Field of Search ............. 252/439, 458; 526/104

[56] References Cited

U.S. PATENT DOCUMENTS

| | | | |
|---|---|---|---|
| 2,331,292 | 10/1943 | Archibald et al. | 252/439 X |
| 3,121,706 | 2/1964 | Feay et al. | 260/94.9 |
| 3,147,239 | 9/1964 | Canterine et al. | 260/93.7 |
| 3,546,312 | 12/1970 | Heckelsburg et al. | 252/439 X |
| 3,887,494 | 6/1975 | Dietz | 252/452 |
| 4,041,224 | 9/1977 | Hoff et al. | 526/96 |
| 4,053,436 | 10/1977 | Hogan et al. | 252/452 |
| 4,080,426 | 3/1978 | Kittrell et al. | 252/439 |
| 4,151,122 | 4/1979 | McDaniel et al. | 252/458 |
| 4,177,162 | 12/1979 | McDaniel et al. | 252/439 |

*Primary Examiner*—Carl F. Dees

[57] ABSTRACT

A process comprising treating silica with at least one of selenium or tellurium under nonoxidizing conditions at a temperature of at least 370° C. and a subsequent second step wherein the thus-treated silica is contacted with an oxidizing ambient at a temperature within the range of 370°–900° C. The silica can contain a chromium compound in which case the resulting product is suitable as a catalyst for the production of higher melt flow olefin polymers suitable for such applications as injection molding, and the like requiring a relatively narrow molecular weight distribution.

16 Claims, 1 Drawing Figure

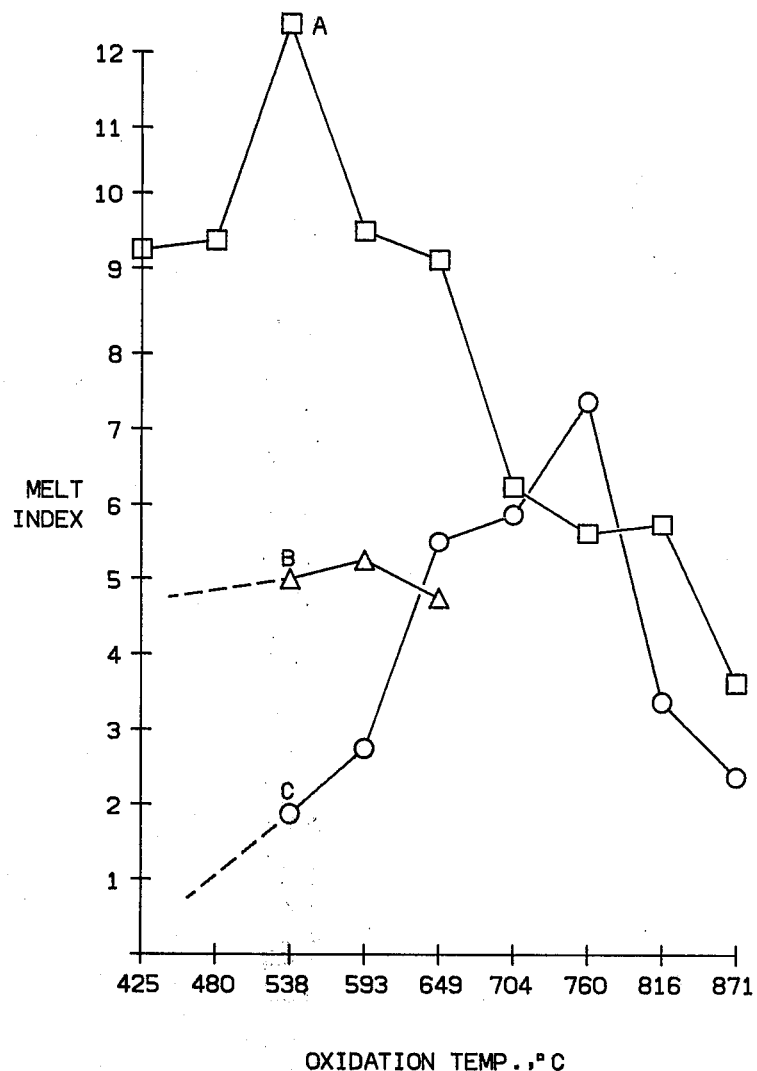
MI AS A FUNCTION OF OXIDATION TEMPERATURE FOR A-COGEL DRY MIXED WITH Se, B-COGEL DRY MIXED WITH Te, C-COGEL CONTROL.

SELENIUM OR TELLURIUM TREATED SILICA

BACKGROUND OF THE INVENTION

This invention relates to the treatment of silica, particularly silica-supported chromium catalysts suitable for olefin polymerization.

Supported chromium oxide catalysts can be used to prepare olefin polymers in a hydrocarbon solution to give a product having characteristics from many standpoints. Supported chromium oxide catalysts can also be used to prepare olefin polymers in a slurry system wherein the polymer is produced in the form of small particles of solid material suspended in a diluent. This process, frequently referred to as a particle-form process, has the advantage of being less complex. However, certain control operations which are easily carried out in the solution process are considerably more difficult in the particle-form process. For instance, in the solution process, control of the molecular weight can be effected by changing the temperature with lower molecular weight (higher melt flow) being obtained at the higher temperatures. However, in the slurry process, this technique is inherently limited since any effort to increase the melt flow to any appreciable extent by increasing temperature will cause the polymer to go into solution and thus destroy this slurry or particle-form process. Also it is, of course, desirable to achieve high catalyst activity so as to make more efficient use of a given size reactor.

SUMMARY OF THE INVENTION

It is an object of this invention to provide a catalyst capable of giving high melt flow polymer; it is a further object of this invention to provide a catalyst suitable for use in slurry polymerization systems; it is a further object of this invention to provide an improved method of activating a chromium-containing catalyst; it is yet a further object of this invention to provide a catalyst capable of giving high activity in addition to high melt flow and narrow molecular weight distribution; it is still yet a further object of this invention to provide a catalyst which offers greater latitude in activation temperature; it is still yet a further object of this invention to treat silica to produce a material particularly suited for use as a support for a chromium catalyst component; and it is still yet a further object of this invention to provide a catalyst capable of giving polymer suitable for injection molding and other applications requiring high melt flow and narrow molecular weight distribution.

In accordance with this invention, a silica composition is treated at an elevated temperature under nonoxidizing conditions with a treating agent selected from selenium, tellurium, and mixtures thereof and thereafter subjected to oxidizing conditions.

BRIEF DESCRIPTION OF THE DRAWING

The drawing, forming a part hereof, is a plot of melt index of the resulting polymer as a function of catalyst oxidation temperature.

DESCRIPTION OF THE PREFERRED EMBODIMENTS

The silica can be any silica-containing gel as broadly disclosed, for instance, in Hogan et al, U.S. Pat. No. 2,825,721 (Mar. 4, 1958), the disclosure of which is hereby incorporated by reference. The silica can contain, if desired, from about 0.1 to 20 weight percent of materials other than silica, such as alumina and titania as is known in the art. The silica is preferably a cogel, that is, a silica produced by coprecipitating silica and a titanium-containing compound. Production of such cogels is described in Dietz, U.S. Pat. No. 3,887,494 (June 3, 1975), the disclosure of which is hereby incorporated by reference. Generally, the titanium compound is present in an amount sufficient to give 0.1 to 10, preferably 0.5 to 5 weight percent titanium based on the weight of the final oxidized (activated) catalyst. Cogels can be formed, for instance, by adding a titanium compound to a mineral acid, introducing an alkali metal silicate into the acid containing said titanium compound to form a hydrogel, aging the hydrogel for greater than one hour, washing the thus aged hydrogel to produce a substantially alkali metal free hydrogel, forming a mixture comprising the thus washed hydrogel and a normally liquid oxygen-containing water soluble organic compound, and separating said organic compound and water from said mixture to form a xerogel.

When the silica is used as a chromium catalyst base, the final activated catalyst contains chromium in an amount generally within the range of 0.001 to 10, preferably 0.1 to 5, more preferably about 0.5 to 1 weight percent based on the weight of the final oxidized (activated) catalyst. The chromium compound can be incorporated as known in the art. For instance, a hydrocarbon solution of a material such as tertiary butyl chromate can be used to impregnate the xerogel; or an aqueous solution of a chromium compound such as ammonium chromate, chromium acetate, chromium nitrate or chromium trioxide, preferably chromium trioxide or chromium acetate can be added to the hydrogel before drying; or chromium can be coprecipitated along with the silica or the silica and titanium. Anhydrous hydrocarbon solutions of π-bonded organochromium compounds such as diarene chromium compounds, for instance dicumene chromium, or biscyclopentadienyl chromium II can be used. In U.S. Pat. No. 3,976,632 (Dec. 4, 1974; U.S. Pat. No. 3,349,067 (Oct. 24, 1967) and U.S. Pat. No. 3,709,853 (Jan. 9, 1973), the disclosures of which are hereby incorporated by reference, are disclosures of suitable chromium compounds.

Since some of the beneficial effect of the selenium or tellurium treatment of silica supported chromium catalysts comes from its effect on the silica itself, chromium-free silica can be treated, i.e., subjected to high temperature contact with selenium or tellurium under nonoxidizing conditions and thereafter subjected to the oxidizing step after which the chromium, preferably in the hexavalent state, is introduced.

The amount of selenium and/or tellurium, calculated as the element, admixed with the silica can range from about 0.005 to about 2 weight percent, more preferably from 0.05 to 1 weight percent and even more preferably from 0.05 to 0.2 weight percent based on the weight of the final oxidized silica composition. One further surprising feature of this invention is the low level selenium or tellurium which is effective. In catalyst applications, an amount of only one-half or less of that necessary to convert all of the chromium to the selenide or telluride can be used.

Elemental selenium or tellurium can be employed. Also, organic compounds of these elements which decompose to the elemental form under the activation conditions subsequently used can be employed. Suitable materials, for example, include selenols, selenides, tellurols, and tellurides which contain hydrocarbyl radicals containing from 1 to about 20 carbon atoms. Examples of specific compounds include dimethyl selenide, dieicosyl selenide, diphenyl selenide, dicyclohexyl selenide, ethaneselenol, benzenetellurol, di-n-butyl telluride, tetraphenyl telluride, and the like and mixtures. With selenium the elemental form is preferred because it vaporizes at about the ideal temperature for the catalyst activation. With tellurium a compound is preferred.

When the object is to produce a chromium containing catalyst, the chromium is preferably at least partially, more preferably predominantly in the hexavalent state on initial contact with the selenium or tellurium. If a chromium compound having a lower valence such as chromium acetate is used, it is preferred to preoxidize the chromium prior to contact with the selenium or tellurium. Even if $CrO_3$ is used, this may still be desirable. While applicant does not wish to be bound by theory, it is believed that the selenium or tellurium treatment has an effect on the chromium, probably making it easier to be reoxidized, especially if it is in the hexavalent state on initial contact with the treating agent, in addition to the effect it has on the silica itself.

The temperature for contact with oxygen prior to treating with selenium or tellurium, if oxygen treatment used at all at this point, is generally from room temperature up to the treating temperature, although it is contact with air at a temperature of 250°–1000° C., preferably 700°–925° C., is most advantageous. The time can simply be whatever time is required to heat the material to treating temperature and generally will be greater than 5 minutes, preferably 5 minutes to 15 hours, more preferably 20 minutes to 10 hours, most preferably 40 minutes to 3 hours. The heating may be continuous or stopped at any point within the above recited temperature ranges.

The treatment of the catalyst with the selenium or tellurium is most conveniently carried out in a fluidized bed and must be carried out at an elevated temperature. This must be done in a nonoxidizing ambient, preferably carbon monoxide or a mixture of carbon monoxide and nitrogen. About 2–100 volume percent CO and 98–0 percent $N_2$, for instance, can be utilized, other nonoxidizing ambients include inert ambients such as carbon dioxide, vacuum, helium, and nitrogen, and reducing ambients in addition to CO such as hydrogen, and materials which decompose into CO and/or $H_2$ at the activation temperatures employed such as hydrocarbons, alcohols, ammonia and carboxylic acids.

The treating agent, if a solid or a high boiling point liquid, can be admixed with the silica prior to the treating process itself. Alternatively, the treating agent, if a volatile liquid, can be admitted in the form of a gas or vapor to the fluidized bed and conveniently admixed with the fluidizing medium, e.g. nitrogen. Fluidizing dry catalyst (chromium on a silica-containing base) with nitrogen removes air or oxygen if air or oxygen has been used to preoxidize the chromium prior to treating with the selenium or tellurium. If nitrogen has been used initially, then, of course, the same nitrogen fluidization can continue. It is preferred that the contact of the preoxidized catalyst with nitrogen at this elevated temperature before treating be very short, preferably less than 30 minutes, more preferably less than 5 minutes, most preferably about 1 minute or less, i.e., the minimum time required to remove oxygen to prevent self-reduction of the Cr in the catalyst. Also, if an oxygen-containing gas such as air is used in the initial heating, it is essential to remove it if organic selenium or tellurium compounds are used since the contact at this temperature between oxygen and the organic material might result in uncontrolled oxidation.

The temperatures employed in treating the silica with selenium or tellurium (either as the element or a compound thereof) is at least about 370° C. and generally can range from about 370° to about 1000° C., preferably from about 700° to 950° C. The times can be relatively short, generally longer than 1 minute, preferably from about 5 minutes to about 5 hours.

The oxidation of the treated composition can take place in any oxidizing ambient containing oxygen, the preferred ambient, of course, being air. Air-nitrogen mixtures containing 10–100 percent air and 0–90 percent nitrogen can be utilized (gas percentages are all in volume percent). In addition, oxidizing ambients such as $NO_2$, $N_2O$, and oxygen-containing halogen materials such as $I_2O_5$ or $Cl_2O$ can be utilized.

The oxidation temperatures employed with the treated silica can range from the same temperature used for the treating step down to about 50 percent or less of the treating temperature. Preferably, the temperature is at least 50° C. lower in the oxidation step. Actual temperatures preferably range from about 370°–900° C. After selenium treatment, the temperature preferably ranges from 400°–700° C., most preferably from 425°–650° C., and after tellurium treatment it preferably ranges from 400°–600° C.

The oxidation time generally is in excess of 5 minutes and usually ranges from about ½ to 10 hours, preferably from 1 to 4 hours.

If desired, the chromium-containing catalyst of this invention can be activated in a continuous activator. For instance, catalyst can be introduced at the top of a compartmentalized vertical activator with the first gas to be used in treating the catalyst being introduced at the bottom of the first (upper) compartment and taken off near the top thereof. The second gas is introduced near the bottom of the second (lower) compartment and taken off near the top thereof and if three or more gases are used, the process can continue in a like manner. In each compartment, the catalyst would be fluidized with the treating medium. Alternatively, two or more compartments could be utilized with the gaseous treating medium, if desired, to increase residence time. An external furnace can heat each compartment to the desired temperature. Otherwise, a conventional batch activator can be used.

The catalysts of this invention can be used to polymerize at least one mono-1-olefin containing 2 to 8 carbon atoms per molecule. These catalysts are of particular applicability in producing ethylene homopolymers and copolymers from mixtures of ethylene and 1 or more comonomers selected from aliphatic mono-1-olefins containing from 3 to 10 carbon atoms and/or conjugated or nonconjugated dienes containing 4 to 8 carbon atoms per molecule. Exemplary comonomers include propylene, 1-butene, 1-hexene, 1-octene, 1-decene, and other aliphatic 1-olefins and mixtures thereof and 1,3-butadiene, isoprene, piperylene, 2,3-dimethyl-1,3-butadiene, 1,4-pentadiene, 1,7-hexadiene, and other conjugated or nonconjugated dienes and mixtures thereof. Ethylene copolymers and terpolymers preferably constitute about 90, preferably 95 to 99 mole percent polymerized ethylene units. Ethylene, propylene, 1-butene and 1-hexene are especially preferred.

The polymers can be prepared from the activated catalysts of this invention by solution polymerization, slurry polymerization, and gas phase polymerization techniques using conventional equipment and contacting processes using either batchwise or continuous polymerization. However, the catalysts of this invention are particularly suitable in slurry polymerizations for the production of high melt index (MI) polymers, i.e., polymers having MI values generally in the 0.5-30 range and above in the absence of molecular weight modifiers, such as hydrogen, and with a molecular weight distribution value sufficiently narrow to be of commercial interest for applications such as injection molding. The slurry process is carried out in an inert diluent such as a paraffin, cycloparaffin or aromatic hydrocarbon at a temperature at which the resulting polymer is insoluble. For predominantly ethylene polymers, the temperature is about 66°-110° C. The MI goes up and the HLMI/MI ratio goes down at higher reactor temperatures. Thus, for any comparison between the invention runs and control runs to be meaningful, they must be carried out at the same polymerization temperature.

The catalysts of this invention can be used with conventional cocatalysts such as triethylaluminum if desired. Also, hydrogen can be used to further increase the MI if desired.

The polymers produced with the catalysts of this invention can be employed in the production of such articles as fibers, film, sheet, containers, toys, and the like by using conventional plastics fabrication equipment.

EXAMPLE 1

Control Catalysts and Ethylene Polymerization Therewith

Two types of control catalysts, designated as cogel and MS-Ti were utilized in particle form ethylene polymerization to provide a basis of comparison with the later described invention catalysts.

The cogel referred to hereinafter was a coprecipitated silica-titania gel comprising about 1.96 weight percent titanium based on the total weight of the activated catalyst. Sufficient $CrO_3$ solution was used to impregnate the wet gel to impart 0.84 weight percent chromium based on the total weight of the activated catalyst. Following impregnation, the wet composite was dried by means of extraction with liquid ethyl acetate.

MS-Ti is derived from a commercially available microspheroidal silica (952 available from Davison Chemical Company), each sample of which was impregnated with chromium acetate and titanium triethanolamine complex sufficient to provide the amounts of chromium and titanium shown in Table I.

Each dry catalyst was activated for polymerization in a fluidized bed by employing a 48 mm O.D. quartz tube charged with about 50 ml (11 g) of the catalyst. The activator was raised from about 25° C. to 870° C. using a heat-up rate of 3°-5° C./minute and in the presence of fluidizing gas consisting of 5 volume percent CO and 95 volume percent nitrogen amounting to about 42 liters/hour. The gas used corresponds to a superficial linear velocity of about 0.1 ft. (0.3 cm) per second. The sample was held at 870° C. for four hours, the CO flow was cut off and the temperature of the sample reduced to the indicated oxidation temperature in nitrogen. Nitrogen flow was stopped, dry air substituted, and the sample was calcined (oxidized) for two hours at the indicated temperature. The activated catalyst was then recovered and stored in a dry atmosphere until ready for polymerization testing.

A suitable portion of each catalyst was charged to a stirred stainless reactor of 2 liter capacity containing 1.5 lbs. (682 g) isobutane as a diluent. The reactor and contents were raised to 107° C. or as specified, ethylene was admitted to give a reactor pressure of 550 psig (3.79 MPa) and the run was continued until sufficient polymer was formed to provide an estimated productivity value of about 5000 g polymer per g catalyst. Ethylene was admitted on demand during the run to maintain the pressure.

When the estimated productivity was reached the run was terminated by stopping the ethylene flow, the ethylene remaining in the reactor and isobutane diluent were removed by flashing and the polymer was recovered, dried and weighed. The melt index measurements of the polymers were determined in accordance with ASTM D 1238-65T, condition E (melt index) and condition F (high load melt index).

The catalyst oxidation temperatures employed in activation, analyzed catalyst properties, catalyst weights, and results obtained are given in Table I. Pore volumes were determined on the catalysts after activation. Titanium values are analyzed for cogel and calculated for the MS-Ti catalysts. The melt index (MI) values listed have been corrected to a common productivity level of 5000 g polymer per g catalyst to provide a comparative basis for judging the MI results. Pore volumes represent the number of cc of isopropanol adsorbed per gram of catalyst according to the Innes method as described in Analytical Chemistry 28, 332-334 (1956).

TABLE I

Control Catalysts and Ethylene Polymerization Results

| Run No. | Type | Catalyst Sur. Area $m^2/g$ | Pore Vol. cc/g | Wt. % Cr(VI) | Wt. % Ti | Ox. Temp. °C. | Wt. mg | Reac. Temp. °C. | Polymer Yield, g | Cal. Prod. g/g cat | Polymer Corr. MI | HLMI MI | Max. Polym. Rate g/g/hr. |
|---|---|---|---|---|---|---|---|---|---|---|---|---|---|
| 1 | cogel | 448 | 2.24 | 0.25 | 1.86 | 538 | 65.9 | 107 | 352 | 5340 | 1.9 | 51 | 3100 |
| 2 | cogel | 442 | 2.27 | .33 | 1.86 | 593 | 57.3 | 107 | 313 | 5460 | 2.7 | 50 | 3770 |
| 3 | cogel | 451 | 2.25 | .33 | 1.86 | 649 | 61.7 | 107 | 337 | 5460 | 5.5 | 41 | 4860 |
| 4 | cogel | 439 | 2.24 | .39 | 1.86 | 704 | 45.0 | 107 | 224 | 4980 | 5.8 | 42 | 5070 |
| 5 | cogel | 442 | 2.29 | .59 | 1.86 | 760 | 36.0 | 107 | 209 | 5810 | 7.4 | 42 | 6170 |
| 6 | cogel | 446 | 2.26 | .71 | 1.86 | 816 | 43.0 | 107 | 228 | 5300 | 3.4 | 46 | 5580 |
| 7 | cogel | 442 | 2.27 | .83 | 1.86 | 871 | 48.4 | 107 | 238 | 4920 | 2.3 | 56 | 5580 |
| 8 | MS-Ti | 290 | 1.52 | .39 | 1 | 538 | 32.3 | 107 | 137 | 4240 | 1.6 | 65 | 6130 |
| 9 | MS-Ti | 280 | 1.43 | .25 | 3 | 538 | 40.6 | 104.5 | 179 | 4410 | 3.8 | 63 | 4290 |
| 10 | MS-Ti | 273 | 1.31 | .20 | 5 | 538 | 42.0 | 104.5 | 219 | 5210 | 5.6 | 68 | 2860 |

The control run results are typical for catalysts given the indicated activation conditions and employed in particle form ethylene polymerization. The activation treatment afforded supported chromium oxide catalysts with CO-$N_2$ mixtures followed by oxidation in air and the effect of various temperatures is disclosed in U.S. Pat. No. 4,151,122 which issued Apr. 24, 1979 to M. P. McDaniel and M. B. Welch.

EXAMPLE II

Invention catalysts and Ethylene Polymerization Therewith

Samples of the dry, nonactivated catalysts described in Example I were individually admixed with either elemental selenium or tellurium in powder form. Each composite was subsequently activated for polymerization as described in the first example.

The catalyst oxidation temperatures employed in activation, analyzed catalyst properties, catalyst weights and results obtained are given in Table II. As before, the MI values shown have been corrected to a common productivity level of 5000 g polymer per g catalyst.

5070). Thus, the preferred temperature ranges are those which a view of the Figure show give a higher MI than the control. But the invention is broadly applicable to higher oxidation temperatures where there is still an advantage in activity. The invention catalyst of the preceding runs are all based on chromium oxide supported on a silica-titania cogel. In control runs 8-10 of Table I and invention runs 24-27 of Table II, the catalysts consist of chromium oxide supported on fast titanated silica. The results indicate that a selenium treatment (runs 24-27) provides only marginally improved catalysts with respect to polymerization activity and mixed results with respect to melt index capability. This is believed to be partially because the chromium was not in the hexavalent state on initial contact with the selenium, i.e., chromium acetate was used instead of $CrO_3$ and it was not given a preoxidation treatment.

The results obtained with the tellurium-treated catalysts of runs 21-23 indicate the melt index capability of such catalysts is superior to the corresponding control catalysts providing that an oxidation temperature of no higher than about 600° to perhaps about 625° C. is employed during the activation sequence. Thus, the telluri-

TABLE II

Se— Or Te— Treated Catalysts and Ethylene Polymerization Results

| Run No. | Type | Catalyst Sur. Area $m^2$/g | Pore Vol. cc/g | Wt.% Ti | Wt. % Se | Wt. % Te | Cr (VI) | Ox. Temp. °C. | Wt. mg | Reac. Temp. °C. | Polymer Yield g | Polymer Corr. MI | Polymer HLMI MI | Prod. g/g cat. | Max. Polym. Rate g/g/hr. |
|---|---|---|---|---|---|---|---|---|---|---|---|---|---|---|---|
| 12 | cogel | 437 | 2.23 | 1.86 | 0.1 | 0 | 0.63 | 425 | 60.6 | 107 | 324 | 9.3 | 39 | 5350 | 6340 |
| 13 | cogel | 440 | 2.25 | 1.86 | 0.1 | 0 | .78 | 480 | 52.5 | 107 | 284 | 9.4 | 44 | 5410 | 6970 |
| 14 | cogel | 444 | 2.24 | 1.86 | 0.1 | 0 | .73 | 538 | 51.9 | 107 | 273 | 12.3 | 36 | 5260 | 5900 |
| 15 | cogel | 436 | 2.24 | 1.86 | 0.1 | 0 | .73 | 593 | 44.1 | 107 | 223 | 9.5 | 42 | 5060 | 8160 |
| 16 | cogel | 437 | 2.26 | 1.86 | 0.1 | 0 | .81 | 649 | 34.4 | 107 | 173 | 9.2 | 41 | 5030 | 8370 |
| 17 | cogel | 446 | 2.26 | 1.86 | 0.1 | 0 | .81 | 704 | 41.7 | 107 | 215 | 6.2 | 46 | 5160 | 6900 |
| 18 | cogel | 455 | 2.26 | 1.86 | 0.1 | 0 | .83 | 760 | 45.4 | 107 | 217 | 5.5 | 41 | 4780 | 7530 |
| 19 | cogel | 435 | 2.29 | 1.86 | 0.1 | 0 | .86 | 816 | 47.6 | 107 | 265 | 5.7 | 41 | 5570 | 7690 |
| 20 | cogel | 438 | 2.17 | 1.86 | 0.1 | 0 | .87 | 871 | 35.1 | 107 | 193 | 3.5 | 44 | 5500 | 10940 |
| 21 | cogel | 427 | 2.29 | 1.86 | 0 | 0.1 | .09 | 538 | 48.6 | 107 | 251 | 5.0 | 42 | 5160 | 2720 |
| 22 | cogel | 429 | 2.28 | 1.86 | 0 | 0.1 | .13 | 593 | 62.3 | 107 | 327 | 5.2 | 43 | 5250 | 3560 |
| 23 | cogel | 427 | 2.31 | 1.86 | 0 | 0.1 | .23 | 649 | 46.7 | 107 | 242 | 4.7 | 46 | 5180 | 4880 |
| 24 | MS-Ti | 296 | 1.48 | 1 | 0.1 | 0 | .45 | 538 | 43.3 | 104.5 | 211 | 1.0 | 79 | 4870 | 6650 |
| 25 | MS-Ti | 288 | 1.41 | 3 | 0.1 | 0 | .27 | 538 | 44.4 | 104.5 | 228 | 3.4 | 71 | 5140 | 4460 |
| 26 | MS-Ti | 283 | 1.33 | 5 | 0.1 | 0 | .25 | 538 | 48.5 | 104.5 | 219 | 7.8 | 57 | 4520 | 4330 |
| 27 | MS-Ti | 279 | 1.25 | 7 | 0.1 | 0 | .20 | 538 | 40.3 | 104.5 | 232 | 6.6 | 72 | 5760 | 2680 |

Inspection of the results presented in Table II shows in runs 12-20 the superior behavior of the selenium-treated catalysts compared to the respective control catalysts of runs 1-7 in Table I with respect to melt index capability or/and polymerization activity. The best control catalysts of runs 3-5 produce polyethylenes having MI values ranging from 5.5 to 7.4. These catalysts are oxidized at temperatures ranging from 649°-760° C. representing a fairly narrow oxidation temperature range of 111° C. The best invention catalysts in runs 12-16, in contrast, are oxidized at temperatures ranging from 425°-649° C. and produce polyethylenes having MI values ranging from 9.2 to 12.3. The invention catalysts thus exhibit a much broader oxidation temperature range of 224° C. (actually greater than this since temperatures below 425° C. can be used) and produce polyethylenes of substantially higher melt index values at higher rates than the control catalysts. Runs 18-20, while oxidized at a temperature outside the preferred range for optimum MI still demonstrate the advantages in activity obtainable in accordance with the invention. For instance, at 704° C. oxidation temperature, the MI values are essentially the same, but the activity of the invention catalyst is greater (6900 vs um-treated catalysts appear to respond somewhat differently to oxidation temperatures than the selenium-treated catalysts. Since tellurium has a much higher boiling point (1390° C.) than selenium (688° C.) the selenium all vaporized during the CO-$N_2$ treating stage of the activation (871° C.) while presumably only a small portion of the tellurium vaporized. It is speculated that the vaporized selenium or tellurium influences the reaction between the catalyst and the CO in some fashion. The reasoning for this is that the amount of selenium or tellurium employed in the examples is about ½ or less that quantity required to convert all the chromium in the catalyst to the selenide or telluride compound.

While this invention has been described in detail for the purpose of illustration it is not to be construed as limited thereby but is intended to cover all changes and modifications within the spirit and scope thereof.

I claim:

1. A process comprising a first step wherein silica is contacted with a treating agent selected from at least one of selenium or tellurium under nonoxidizing conditions at a temperature of at least 370° C. and a subsequent second step wherein it is contacted with an oxidizing ambient at a temperature within the range of 370°–900° C.

2. A method according to claim 1 for producing a catalyst wherein said silica contains a chromium compound and is heated in the presence of oxygen prior to said treatment with said selenium or tellurium, said selenium or tellurium being in elemental form and being used in an amount within the range of 0.05 to 1 weight percent of the element based on the weight of the oxidized catalyst and wherein said oxidizing ambient comprises oxygen.

3. A method according to claim 2 wherein after said heating in the presence of oxygen prior to said treatment, a nitrogen ambient is introduced to flush out the air prior to said introduction of said selenium or tellurium.

4. A method according to claim 3 wherein said nitrogen flush is carried out for less than 30 minutes.

5. A method according to claim 2 wherein said treatment is with elemental selenium under reducing conditions at a temperature within the range of 700°–950° C. and said oxidation is carried out at a temperature within the range of 400°–700° C., which oxidation temperature is also at least 50° C. lower than said temperature for treatment with said selenium.

6. A method according to claim 2 wherein said treatment is with tellurium under reducing conditions at a temperature within the range of 700°–950° C. and said oxidation is carried out at a temperature within the range of 400°–600° C., which oxidation temperature is also at least 50° C. lower than said temperature for treatment with said tellurium.

7. A method according to claim 2 wherein said contact with said selenium or tellurium is for a time within the range of 5 minutes to 5 hours and said oxidation step is carried out for a time within the range of 1 to 4 hours, said selenium or tellurium being used in an amount of one-half or less of that necessary to convert all of the chromium to the selenide or telluride.

8. A method according to claim 1 for producing a catalyst wherein said silica contains a chromium compound in an amount sufficient to give 0.1 to 5 weight percent chromium in the final activated catalyst and wherein said chromium is at least partially in the hexavalent state on initial contact with said selenium or tellurium.

9. A method according to claim 2 wherein said silica is a coprecipitated silica titanium composition containing a titanium compound in sufficient amount to give 0.5 to 5 weight percent titanium in the final activated catalyst.

10. A method according to claim 9 wherein said chromium is incorporated into said catalyst as an aqueous solution of $CrO_3$ at the hydrogel stage.

11. A method according to claim 10 wherein said chromium is incorporated into said silica in the form of chromium acetate and the resulting silica-chromium composition is oxidized to convert at least a portion of said chromium to the hexavalent state prior to said first contact with said selenium or tellurium.

12. A method according to claim 1 for producing a catalyst wherein said silica is coprecipitated with a titanium compound which titanium compound is present in an amount sufficient to give 0.5 to 5 weight percent titanium in the final activated catalyst, said chromium is added as an aqueous solution of a chromium compound to said silica at the hydrogel stage in an amount sufficient to give 0.1 to 5 weight percent chromium in the final activated catalyst, said chromium being at least partially in the hexavalent state on initial contact with said treating agent, said treating agent being elemental selenium, said selenium being used in an amount within the range of 0.05 to 0.2 weight percent selenium based on the final activated catalyst, said treatment with said selenium being carried out under reducing conditions at a temperature within the range of 700°–950° C. and said contact with said oxidizing ambient being carried out in air at a temperature within the range of 400°–700° C.

13. A method according to claim 12 wherein said treatment with said selenium is carried out in the presence of CO.

14. A catalyst produced by the method of claim 13.

15. A treated silica composition produced by the method of claim 1.

16. A catalyst produced by the method of claim 2.

* * * * *